(12) United States Patent
Jin et al.

(10) Patent No.: US 9,038,105 B2
(45) Date of Patent: May 19, 2015

(54) THUMBNAIL PUBLICATION

(71) Applicant: Verizon Patent and Licensing Inc., Arlington, VA (US)

(72) Inventors: Zhiying Jin, Lexington, MA (US); Sarma Pydipally, Watertown, MA (US); Haosheng Guo, Nashua, NH (US); Haiyan Zhou, Winchester, MA (US); Fang Zhu, Woburn, MA (US); Jianxiu Hao, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/295,775

(22) Filed: Jun. 4, 2014

(65) Prior Publication Data
US 2014/0289773 A1 Sep. 25, 2014

Related U.S. Application Data

(62) Division of application No. 12/939,837, filed on Nov. 4, 2010, now Pat. No. 8,776,124.

(51) Int. Cl.
| | |
|---|---|
| *H04N 5/445* | (2011.01) |
| *H04N 21/41* | (2011.01) |
| *H04N 21/414* | (2011.01) |
| *H04N 21/431* | (2011.01) |
| *H04N 21/482* | (2011.01) |
| *H04N 21/433* | (2011.01) |
| *H04N 21/462* | (2011.01) |

(52) U.S. Cl.
CPC ..... *H04N 21/4126* (2013.01); *H04N 21/41407* (2013.01); *H04N 21/4312* (2013.01); *H04N 21/482* (2013.01); *H04N 21/4332* (2013.01); *H04N 21/4622* (2013.01)

(58) Field of Classification Search
USPC .......................................... 725/34–36, 44–46
See application file for complete search history.

(56) References Cited

U.S. PATENT DOCUMENTS

| | | | | |
|---|---|---|---|---|
| 7,403,993 | B2 * | 7/2008 | John et al. ...................... | 709/226 |
| 7,782,365 | B2 | 8/2010 | Levien et al. | |
| 2007/0203942 | A1 * | 8/2007 | Hua et al. ..................... | 707/104.1 |
| 2008/0086747 | A1 | 4/2008 | Rasanen et al. | |
| 2008/0292212 | A1 * | 11/2008 | Ozaki ........................... | 382/284 |
| 2010/0281103 | A1 * | 11/2010 | Imai et al. ..................... | 709/203 |

* cited by examiner

*Primary Examiner* — Jivka Rabovianski

(57) ABSTRACT

A video service provider system may include one or more devices. The one or more device may receive thumbnails of programs that are currently airing on a group of television channels and match the received thumbnails with metadata. The metadata may include information relating to at least one of the television channels or the programs. The one or more devices may further provide, to a remote device, a set of thumbnails, of the captured thumbnails, and the metadata matching the set of thumbnails. The remote device may make the set of thumbnails and the metadata available to a user.

20 Claims, 19 Drawing Sheets

410 ↘
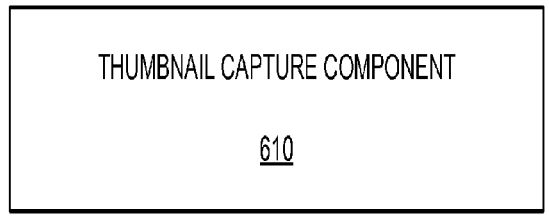
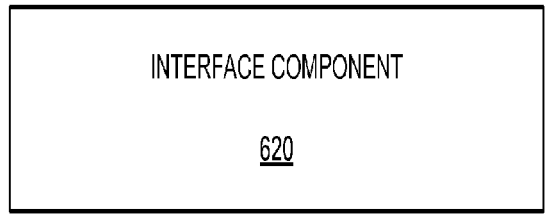
FIG. 6

THUMBNAIL PUBLICATION

RELATED APPLICATION

This application is a divisional of U.S. patent application Ser. No. 12/939,837, filed Nov. 4, 2010, the disclosure of which is hereby incorporated herein in its entirety.

BACKGROUND INFORMATION

Television distribution systems, such as fiber optic networks, cable networks, and satellite networks, provide users with a large number of television programs. In some instances, television distribution systems may provide a program guide that provides a textual list of the times and channels that programs are available for viewing via the television distribution systems. A user may interact with the program guide to determine when programs are airing for instant viewing and/or recording.

BRIEF DESCRIPTION OF THE DRAWINGS

FIG. 6 is a diagram of example functional components of a portion of the video hub office of FIG. 4;

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Figure 1:
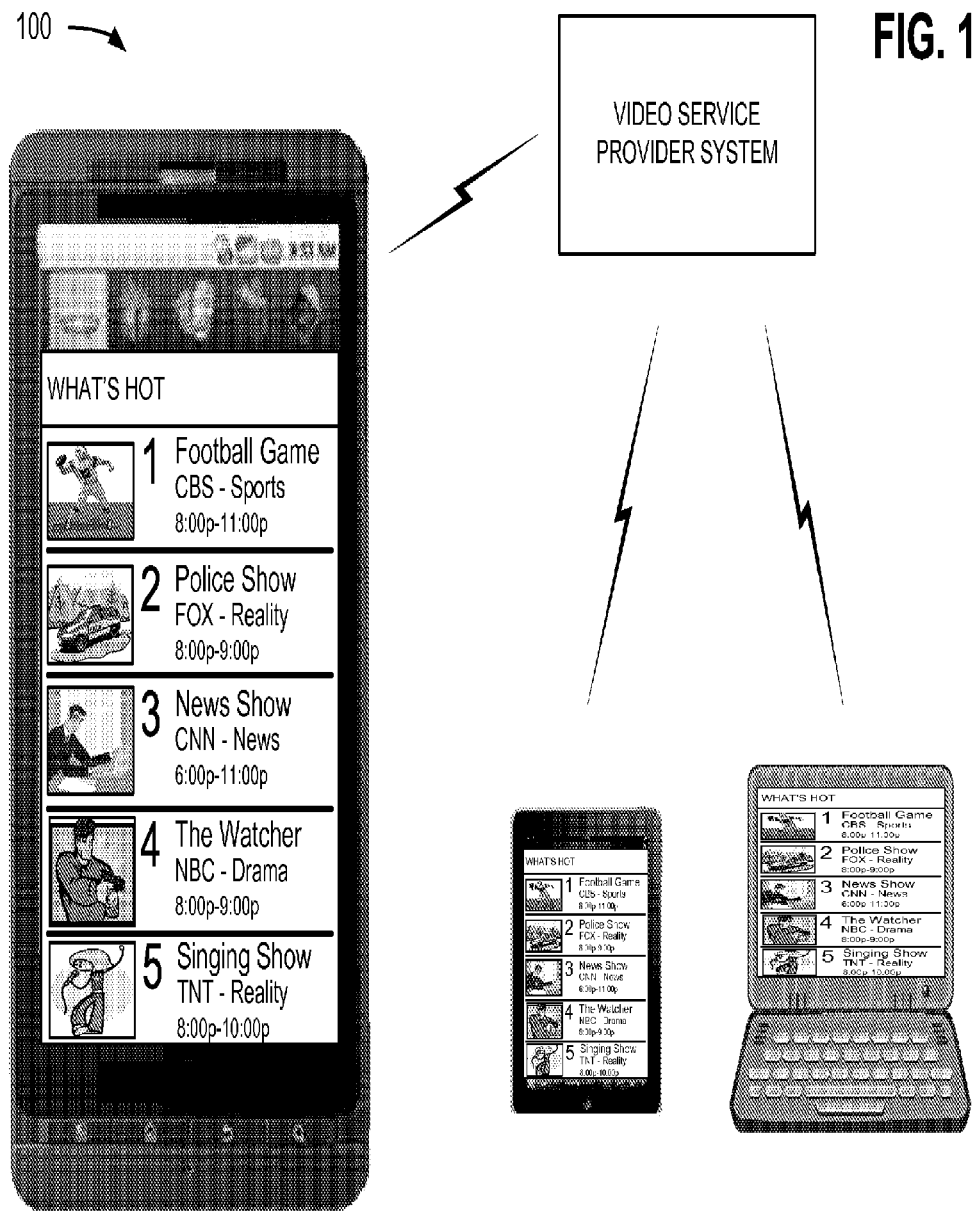
FIG. 1 is an example of a concept described herein.

FIG. 1 is an example of a concept 100 described herein. As illustrated, a video service provider system may publish, to user devices, thumbnails of programs that are currently available on television. In one implementation, the video service provider system may capture thumbnails (e.g., an image) of the available programs. For example, if a first television channel is currently airing a program called "Police Show," a second television channel is currently airing a football game, a third television program is currently airing a news show, etc., the video service provider system may capture images of the programs, that are currently airing, as thumbnails.

The video service provider system may provide the captured thumbnails to the user devices, as shown in FIG. 1, to reflect what is currently airing on the television channels. In one implementation, the video service provider system may provide a list of thumbnail images to the user devices, based on one or more criteria. For example, the video service provider system may provide a list of the most popular programs that are currently available on television (e.g., a "what's hot list"). In the example illustrated in FIG. 1, the video service provider system has provided a list of thumbnails of the most popular programs, sorted based on the popularity of the programs. In one implementation, the thumbnails may be dynamically updated (e.g., as further thumbnails are captured by the video service provider system) and the list may be dynamically updated (e.g., if the popularity of the programs changes). If a user is interested in watching a particular program in the list, the user may select the particular program (e.g., by selecting the thumbnail for the particular program), which may cause the particular program to be streamed to the user's device.

The word "program" as used herein is to be broadly construed as any type of programming that is currently available on television, including live events, pre-recorded events, pay-per-view programming, and/or other types of video content.

Figure 2:
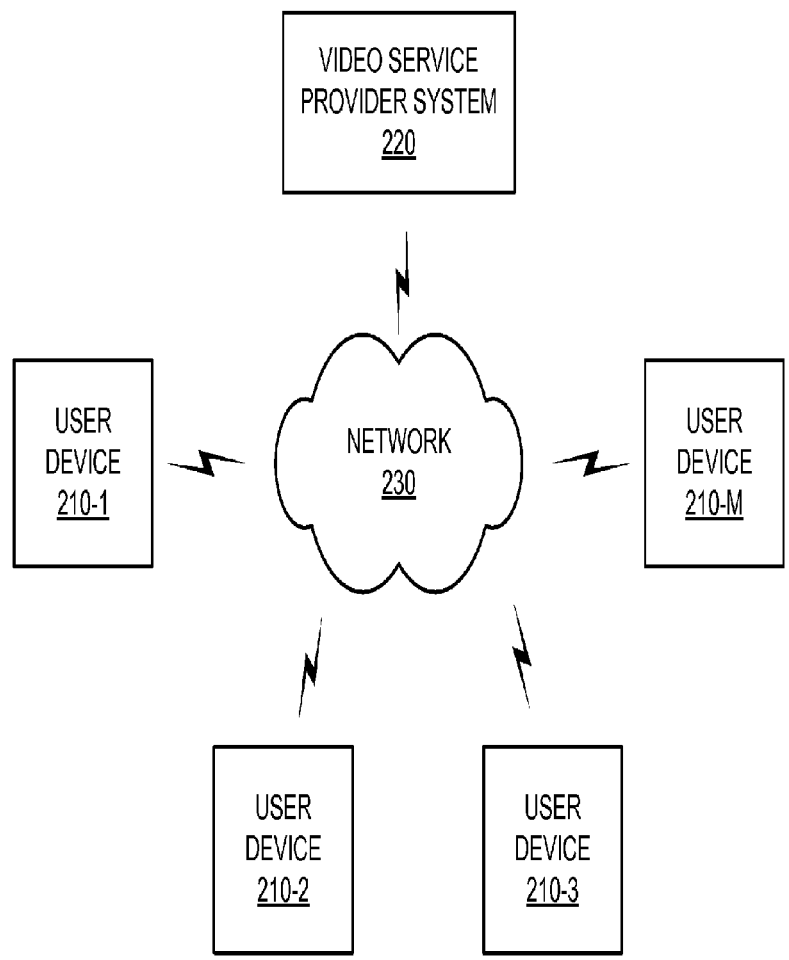
FIG. 2 is an example network in which systems and/or methods described herein may be implemented.

FIG. 2 is an example network 200 in which systems and/or methods described herein may be implemented. As illustrated, network 200 may include a group of user devices 210-1 through 210-M (referred to collectively as "user devices 210" and, in some instances, individually as "user device 210"), a video service provider system 220, and a network 230.

User devices 210 may include one or more devices that are capable of receiving and displaying thumbnails that are published by video service provider system 220. For example, user devices 210 may include personal computers, laptop computers, portable communication devices (such as smart phones, tablet computer, etc.), personal gaming systems, and/or other types of devices. User devices 210 may connect to network 230 via wired and/or wireless connections.

Video service provider system 220 may include one or more devices that may capture thumbnails of programs currently airing on television channels and send the captured thumbnails to one or more devices, such as a server (which may publish the thumbnails on a web page) and/or a user device. In one implementation, video service provider system 220 may dynamically update the thumbnails provided to the one or more devices. Video service provider system 220 may connect to network 230 via wired and/or wireless connections.

Network 230 may include one or more networks of any type, including a television network (such as a cable television network or a fiber optic television network), a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Although FIG. 2 shows example components of network 200, in other implementations, network 200 may include fewer components, different components, differently arranged components, or additional components than depicted in FIG. 2. Additionally, or alternatively, one or more components of network 200 may perform the tasks described as being performed by one or more other components of network 200.

Figure 3:
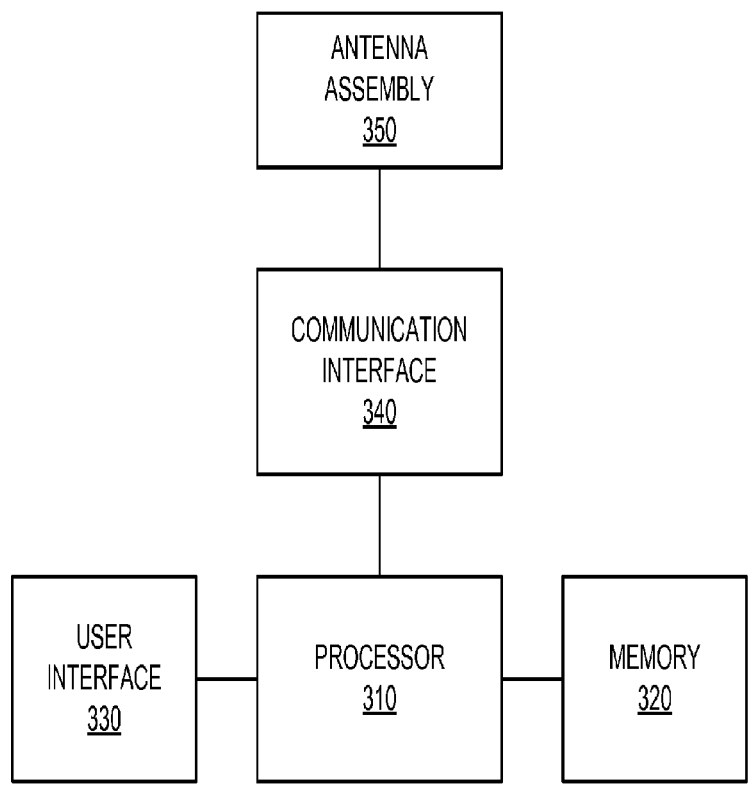
FIG. 3 is a diagram of example components of the user device of FIG. 2.

FIG. 3 is a diagram of example components of user device 210. As shown in FIG. 3, user device 210 may include a processor 310, a memory 320, a user interface 330, a communication interface 340, and/or an antenna assembly 350. Processor 310 may include one or more processors, microprocessors, application specific integrated circuits (ASICs), field programmable gate arrays (FPGAs), etc. Processor 310 may control operation of user device 210 and its components. Memory 320 may include a random access memory (RAM), a read-only memory (ROM), and/or another type of memory to store data and instructions that may be used by processor 310.

User interface 330 may include mechanisms for inputting information to user device 210 and/or for outputting information from user device 210. Examples of input and output mechanisms might include buttons (e.g., control buttons, keys of a keypad, a joystick, etc.) to permit data and control commands to be input into user device 210; a speaker to receive electrical signals and output audio signals; a microphone to receive audio signals and output electrical signals; a display to receive input (e.g., when the display is implemented as a touch screen) and/or output visual information (e.g., text input into user device 210); and/or a vibrator to cause user device 210 to vibrate.

Communication interface 340 may include, for example, a transmitter that may convert baseband signals from processor 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit the RF signals over the air, and receive RF signals over the air and provide them to communication interface 340. In one implementation, for example, communication interface 340 may communicate with a network, such as network 230.

As will be described in detail below, user device 210 may perform certain operations in response to processor 310 executing software instructions of an application contained in a computer-readable medium, such as memory 320. A computer-readable medium may be defined as a non-transitory memory device. A memory device may include a space within a single physical memory device or spread across multiple physical memory devices.

The software instructions may be read into memory 320 from another computer-readable medium or from another device via communication interface 340. The software instructions contained in memory 320 may cause processor 310 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 3 shows example components of user device 210, in other implementations, user device 210 may include fewer components, different components, differently arranged components, or additional components than depicted in FIG. 3. Additionally, or alternatively, one or more components of user device 210 may perform one or more of the tasks described as being performed by one or more other components of user device 210.

Figure 4:
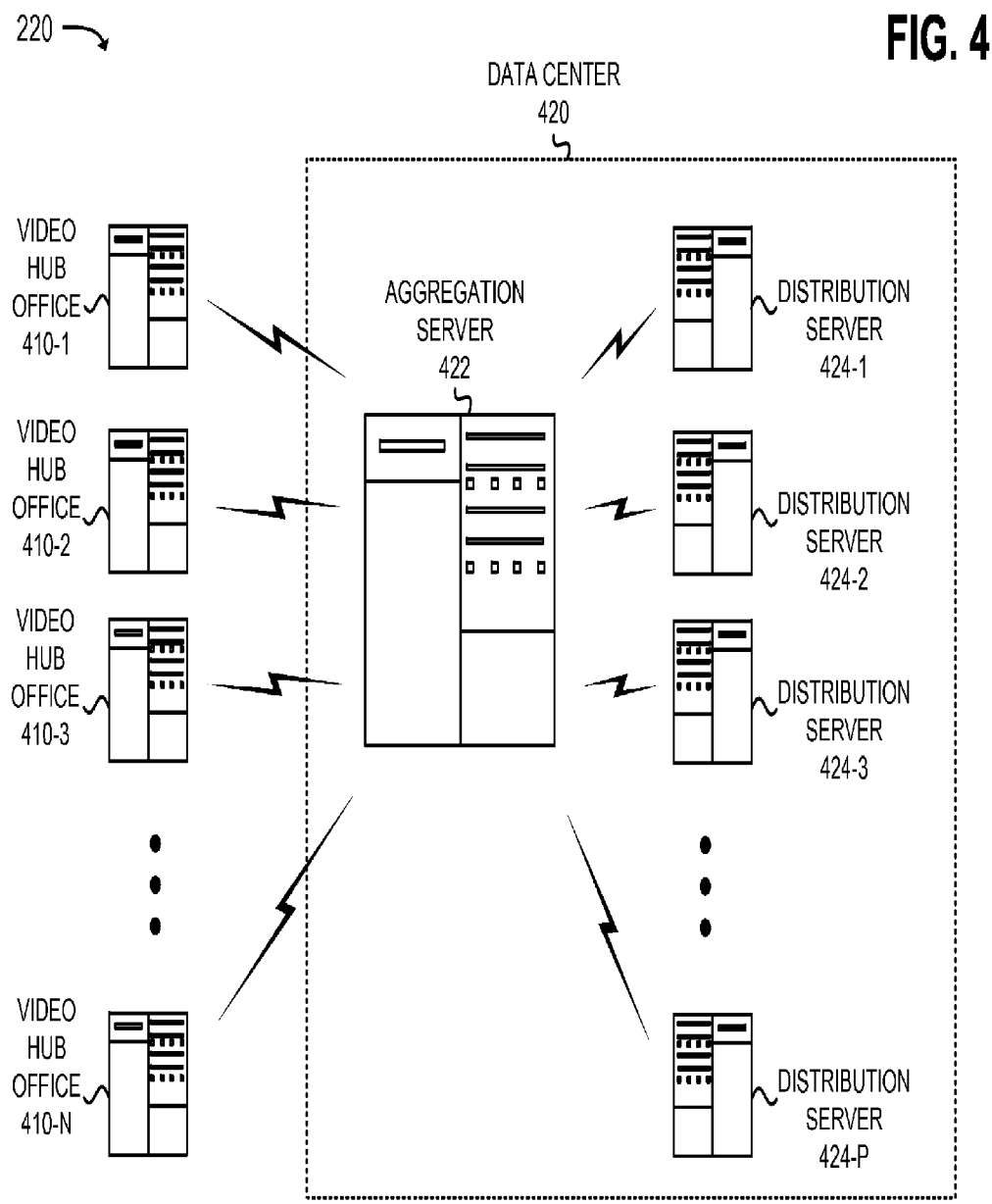
FIG. 4 is a diagram of example components of the video service provider system of FIG. 2.

FIG. 4 is a diagram of example components of video service provider system 220. As shown in FIG. 4, video service provider system 220 may include a group of video hub offices 410-1 through 410-N (referred to collectively as "video hub offices 410" and, sometimes individually as "video hub office 410") and a data center 420.

Video hub offices 410 may include one or more geographically-distributed devices that act as video distribution points for television service providers. Each video hub office 410 may be associated with a large number of television channels (e.g., hundreds of different television channels). In one implementation, each video hub office 410 may capture thumbnails of the different television channels with which the respective video hub office 410 is associated. Each video hub office 410 may provide the captured thumbnails to data center 420. Video hub offices 410 may connect to data center 420 via wired and/or wireless connections.

Data center 420 may aggregate thumbnails received from video hub offices 410 and provide the thumbnails, along with information relating to the thumbnails, to devices, such as user devices 210. Data center 420 may connect to user devices 210 via wired and/or wireless connections.

As shown in FIG. 4, data center 420 may include an aggregation server 422 and a group of distribution servers 424-1 through 424-P (referred to collectively as "distribution servers 424" and, in some instances, individually as "distribution server 424"). Aggregation server 422 may receive thumbnails from video hub offices 410 via one or more ports. Aggregation server 422 may match the received thumbnails to information corresponding to the thumbnails (e.g., information identifying the name of the program corresponding to the thumbnail, information identify a time period that the program will be airing, information identifying the television network that is providing the program, a category of the program (e.g., sports, drama, a reality TV program, comedy, action, etc.), and/or other types of information). The matching information will be referred to as "metadata" hereinafter. Aggregation server 422 may further store the thumbnails and the metadata for later transmission to distribution servers 424. In one implementation, aggregation server 422 may transmit the thumbnails and the metadata based on one or more criteria. Aggregation server 422 may transmit the thumbnails and the metadata to distribution servers 424 via wired and/or wireless connections.

Distribution servers 424 may include one or more devices that receive thumbnails and metadata from aggregation server 422 and provide the thumbnails and metadata to one or more devices, such as user devices 210 and/or a server. In one implementation, distribution servers 424 may provide one or more thumbnails (and associated metadata) to a user device 210 in response to a request for thumbnails from user device 210. Additionally, or alternatively, one or more of distribution servers 424 may provide thumbnails (and associated metadata) to a server for populating a web page. The one or more distribution servers 424 may provide the thumbnails (and associated metadata) either automatically or in response to a request from the server. Distribution server 424 may connect to the one or more devices via wired and/or wireless connections.

Although FIG. 4 shows example components of video service provider system 220, in other implementations, video service provider system 220 may include fewer components, different components, differently arranged components, or additional components than depicted in FIG. 4. Additionally, or alternatively, one or more components of video service provider system 220 may perform one or more of the tasks described as being performed by one or more other components of video service provider system 220.

Figure 5:
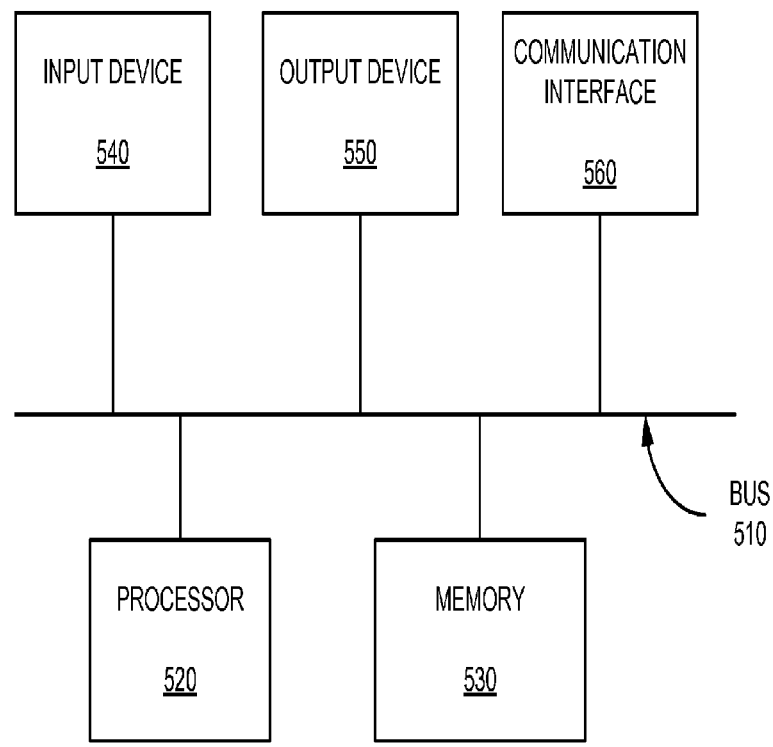
FIG. 5 is a diagram of example components of an entity according to an implementation.

FIG. 5 is a diagram of example components of an entity 500 according to an implementation. Entity 500 may correspond to a video hub office 410, aggregation server 422, and/or a distribution server 424. As illustrated, entity 500 may include a bus 510, a processor 520, a memory 530, an input device 540, an output device 550, and a communication interface 560.

Bus 510 may permit communication among the components of entity 500. Processor 520 may include one or more processors and/or microprocessors that interpret and execute instructions. Additionally or alternatively, processor 520 may be implemented as or include one or more ASICs, FPGAs, or the like. Memory 530 may include a RAM or another type of dynamic storage device that stores information and instructions for execution by processor 520, a ROM or another type of static storage device that stores static information and instructions for the processor 520, and/or some other type of magnetic or optical recording medium and its corresponding drive for storing information and/or instructions.

Input device 540 may include a device that permits an operator to input information to entity 500, such as a keyboard, a keypad, a mouse, a pen, a microphone, a touchscreen, one or more biometric mechanisms, and the like. Output device 550 may include a device that outputs information to the operator, such as a display, a speaker, etc.

Communication interface 560 may include any transceiver-like mechanism that allows entity 500 to communicate with other devices and/or systems. For example, communication interface 560 may include mechanisms for communicating with components within network 200.

As will be described in detail below, entity 500 may perform certain functions relating to the processing and provisioning of thumbnails of programs available on television channels. Entity 500 may perform these and other functions in response to processor 520 executing software instructions contained in a computer-readable medium, such as memory 530. The software instructions may be read into memory 530 from another computer-readable medium or from another device via communication interface 560. The software instructions contained in memory 530 may cause processor 520 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 5 illustrates example components of entity 500, in some implementations, entity 500 may include fewer components, different components, differently arranged components, or additional components than those depicted in FIG. 5. Additionally, or alternatively, one or more components of entity 500 may perform one or more tasks described as being performed by one or more other components of entity 500.

FIG. 6 is a diagram of example functional components of a portion of video hub office 410. In one implementation, the functional components described in connection with FIG. 6 may be implemented via, for example, processor 520 executing instructions contained in memory 530. As illustrated, video hub office 410 may include a thumbnail capture component 610 and an interface component 620.

Thumbnail capture component 610 may include one or more components that capture thumbnails of programs currently airing on television channels with which video hub office 410 is associated. For example, thumbnail capture component 610 may capture, at some time period, thumbnails for the programs. In one implementation, thumbnail capture component 610 may capture thumbnails, for each television channel, roughly every 7 seconds. Different time periods (or groups of time periods) may alternatively be used. For example, thumbnail capture component 610 may capture thumbnails, for each television channel, at a first rate at certain times of the day and at a second, different rate at other times of the day. Thumbnail capture component 610 may simultaneously capture thumbnails for all programs currently airing on the television channels with which video hub office 410 is associated. Alternatively, thumbnail capture component 610 may simultaneously capture a subset of all of the associated television channels.

A thumbnail, as this term is used herein, may refer to an image that corresponds to a snapshot (e.g., a single video frame) image of the video of a television channel. The thumbnail image may be reduced in resolution relative to its corresponding snapshot image.

Thumbnail capture component 610 may assign a name to each captured thumbnail. In one implementation, the name may be a unique name that corresponds to the television channel from which the thumbnail was captured. For example, thumbnail capture component 610 may assign a name of "0001.jpg" to the thumbnail that was captured from channel 1. In addition, thumbnail capture component 610 may associate other information with the thumbnail. For example, thumbnail capture component 610 may cause a date and/or time, reflecting the date and/or time that a particular thumbnail was captured, to be associated with the particular thumbnail. Alternatively, the name assigned by thumbnail capture component 610 to a thumbnail may reflect not only the television channel from which the thumbnail was captured, but also the date and/or time. Thus, in the example above, thumbnail capture component 610 may assign a name of 00011010101100.jpg, where "0001" may correspond to the television channel, "101010" may correspond to the date (i.e., Oct. 10, 2010), and "1100" may correspond to the time (i.e., 11 am). Other naming conventions may alternatively be used.

Interface component 620 may include one or more components that provide captured thumbnails to aggregation server 422. In one implementation, interface component 620 may provide the captured thumbnails automatically in response, for example, to thumbnail capture component 610 capturing the thumbnails. Interface component 620 may also provide captured thumbnails at other times. For example, interface component 620 may provide captured thumbnails in response to requests from aggregation server 422 and/or at periodic intervals.

In addition, interface component 620 may provide one or more lists to aggregation server 422 that identifies television channels (or programs) that are currently the most popular for that particular video hub office 410. For example, a particular video hub office 410 (e.g., video hub office 410-1) may be associated with a particular geographic region and may transmit one or more lists to aggregation server 422 that identify the most popular television channels (or programs) in one or more areas in the particular geographic region. By way of example, assume that video hub office 410-1 is associated with the Washington, D.C. area. Interface component 620 may transmit a single list that identifies the television channels (or programs) that are currently most popular in the Washington, D.C. area and/or multiple lists (e.g., based on the zip codes in the Washington, D.C. area) that identify the television channels (or programs) that are currently most popular in each zip code in the Washington, D.C. area. Other alternatives are possible. For example, interface component 620 may transmit, to aggregation server 422, multiple lists for a geographic region, where each list corresponds to the most popular television channels (or programs) that are currently available on television on a per category basis (e.g., sports, comedy, drama, etc.) and/or based on other information.

Although FIG. 6 illustrates example functional components of video hub office 410, in other implementations, video hub office 410 may include fewer functional components, different functional components, differently arranged functional components, or additional functional components than those depicted in FIG. 6. Additionally, or alternatively, one or more functional components of video hub office 410 may perform one or more tasks described as being performed by one or more other functional components of video hub office 410.

Figure 7:
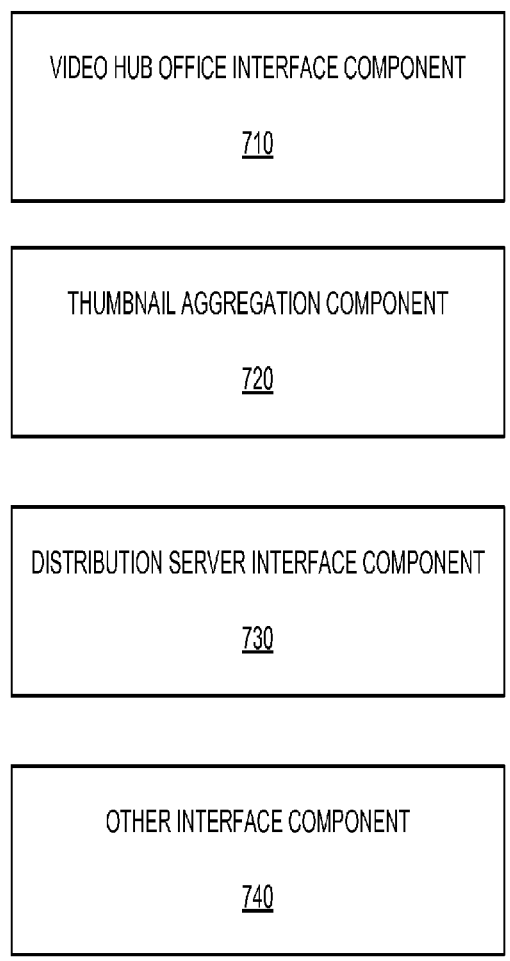
FIG. 7 is a diagram of example functional components of a portion of the aggregation server of FIG. 4.

FIG. 7 is a diagram of example functional components of a portion of aggregation server 422. In one implementation, the functional components described in connection with FIG. 7 may be implemented via, for example, processor 520 executing instructions contained in memory 530. As illustrated, aggregation server 422 may include a video hub office interface component 710, a thumbnail aggregation component 720, a distribution server interface component 730, and another interface component 740.

Video hub office interface component 710 may include one or more components that allow aggregation server 422 to receive thumbnails from video hub offices 410. For example, video hub office interface component 710 may include a group of ports (or other types of communication interfaces) that may receive information (e.g., including thumbnails) from video hub offices 410. Video hub office interface component 710 may forward received thumbnails to thumbnail aggregation component 720.

Video hub office interface component 710 may also receive one or more lists from video hub offices 410 that identify the television channels (or programs) that are associated with video hub offices 410 and are currently most popular. For example, as described above, a video hub office 410 may transmit one or more lists to video hub office interface component 710 that identify the most popular television channels (or programs) in one or more areas in the particular geographic region with which video hub office 410 is associated.

Thumbnail aggregation component 720 may receive thumbnails from video hub office interface 710. Thumbnail aggregation component 720 may further receive metadata relating to the television channels associated with video hub offices 410. The metadata may include program information (such as, for example, the name of the program, the time that the program is airing, the television channel on which the program is airing, the category of the program (e.g., sports event, drama, comedy, etc.), and/or other types of information), television channel information (such as, for example, the name of the television network that provides the television channel, a geographic region with which the television channel is associated, etc.), and/or other types of information that may be displayed with thumbnails.

Thumbnail aggregation component 720 may match incoming thumbnails to the appropriate metadata. For example, thumbnail aggregation component 720 may identify a program with which a received thumbnail is associated based on the name assigned to the thumbnail and the particular video hub office 410 from which the thumbnail was received. As an example, if a received thumbnail has a name of 0001.jpg, then thumbnail aggregation component 720 can look up the program with which the thumbnail is associated by determining, for example, what program is currently airing on channel 1 in connection with the particular video hub office 410 that provided the thumbnail. Thumbnail aggregation component 720 may make this determination based, for example, on television guide data that is either stored at aggregation server 422 or received from another device. Thumbnail aggregation component 720 may then use the identity of the program to obtain the corresponding metadata. Alternatively, thumbnail aggregation component 720 may obtain the corresponding metadata in other ways (e.g., by directly using the name assigned to the thumbnail). Thumbnail aggregation component 720 may store the received thumbnails and matching metadata. In one implementation, thumbnail aggregation component 720 may store the received thumbnails and matching metadata in a group of queues, where, for example, each queue corresponds to a different television channel.

Distribution server interface component 730 may include one or more components that provide thumbnails and metadata to distribution servers 424. In one implementation, distribution server interface component 730 may provide the thumbnails and metadata, to distribution servers 424, in response to one or more events. The events may include, for example, expiration of a timer, receipt of a request for thumbnails, an action of an administrator, and/or other types of events. Distribution server interface component 730 may provide thumbnails and metadata, to distribution servers 424, at different rates and/or in different quantities at different times of the day.

Other interface component 740 may include one or more components that receive other information that aid in providing thumbnails to devices. For example, the other information may include television guide information (which may be used for obtaining metadata for received thumbnails), information relating to subscribers of video service provider system 220, and/or other types of information.

Although FIG. 7 illustrates an example of functional components that may be included in aggregation server 422, in other implementations, aggregation server 422 may include fewer functional components, different functional components, differently arranged functional components, or additional functional components than those depicted in FIG. 7. Additionally, or alternatively, one or more functional components of aggregation server 422 may perform one or more tasks described as being performed by one or more other functional components of aggregation server 422.

Figure 8A:
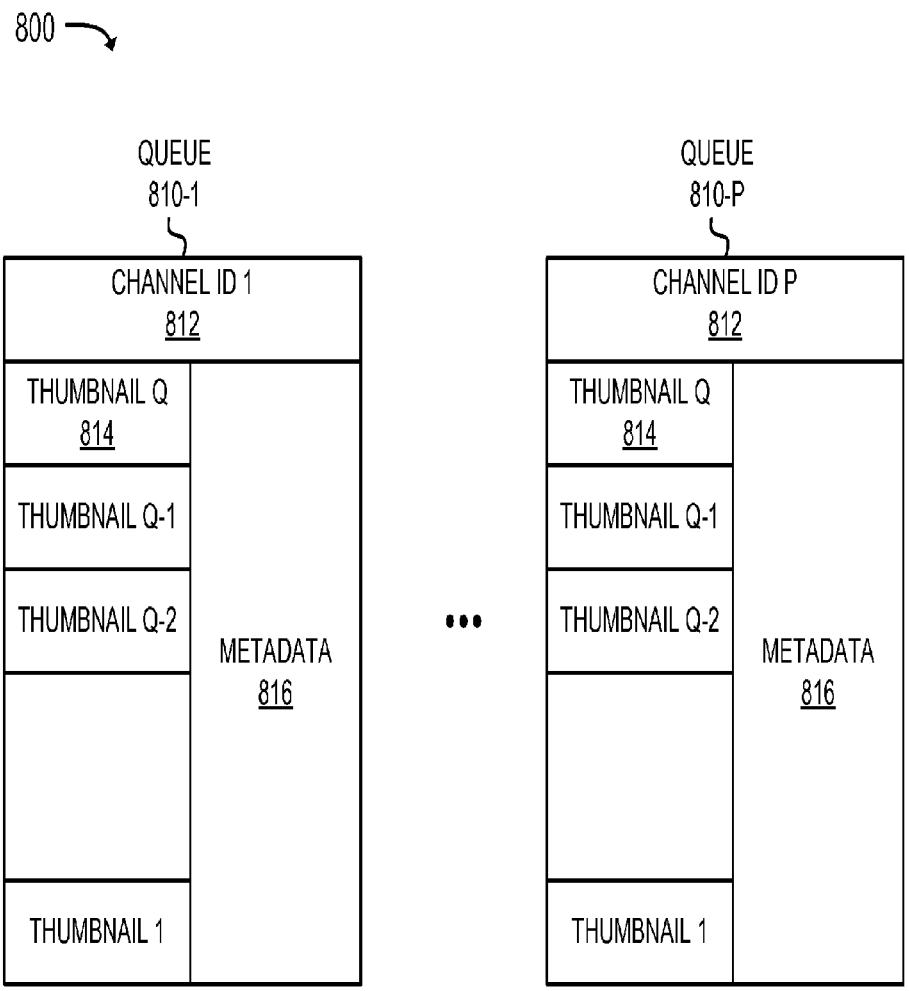
FIG. 8A is an example of a group of queues that may be associated with the aggregation server of FIG. 4.

FIG. 8A is an example of a group 800 of queues 810-1 through 810-P (referred to collectively as "queues 810" and, at times, individually as "queue 810") that may be associated with aggregation server 422. Queues 810 may be stored locally at aggregation server 422, or stored at one or more different and possibly remote locations. As illustrated, each queue 810 may store a channel identifier (ID) 812, a group of thumbnails 814, and metadata 816.

Channel ID 812 may include information that identifies a television channel. The information may include a unique sequence of characters. The channel identifier may not only identify the channel, but also the geographic region with which the channel is associated (e.g., information identifying a particular geographic region or information identifying the channel as a national television channel). Thumbnails 814 may store one or more thumbnails or links to thumbnails that were received for the channel identified by channel ID 812. In one implementation, each queue 810 may store thumbnails 814 in a last in, first out manner. Metadata 816 may store information that corresponds to the television channel identified by channel ID 812 and/or to the program that is being aired on the television channel identified by channel ID 812.

For example, the information may include the name of the program, the time that the program is airing, the category of the program (e.g., sports, drama, comedy, etc.), the name of the television network that provides the television channel, and/or other types of information that may be displayed with thumbnails.

Although FIG. 8A shows example queues 810, in other implementations, queues 810 may include fewer information, different information, differently arranged information, or additional information than depicted in FIG. 8A.

Figure 8B:
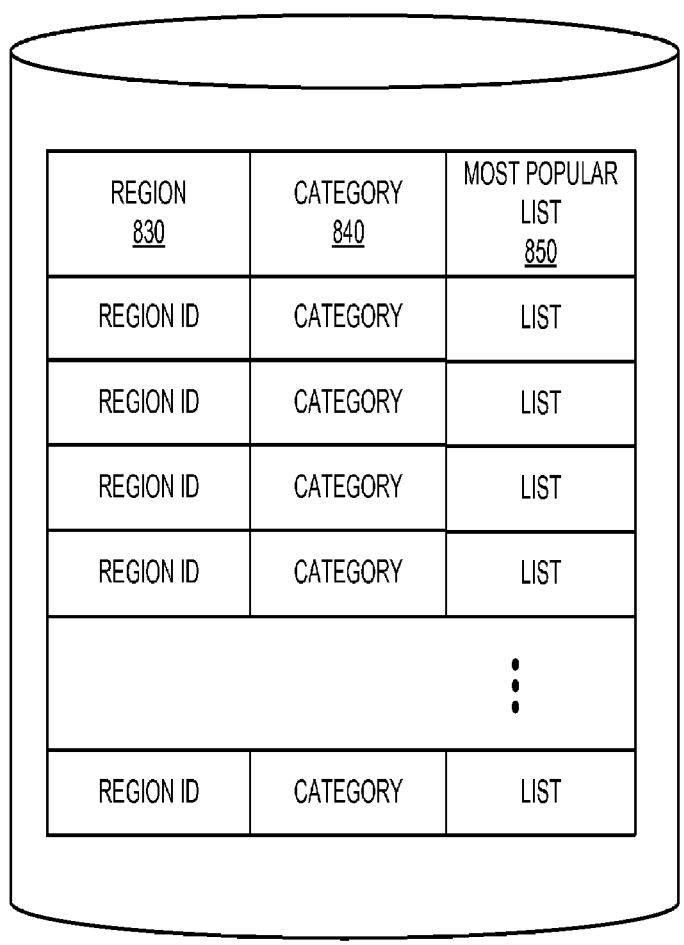
FIG. 8B is an example database that may be associated with the aggregation server of FIG. 4.

FIG. 8B is an example database 820 that may be associated with aggregation server 422. While only one database is described below, database 820 may include multiple databases stored locally at aggregation server 422, or stored at one or more different and possibly remote locations. As illustrated, database 820 may maintain a group of entries in the following example fields: a region field 830, a category field 840, and a most popular list field 850.

Region field 830 may store information that identifies a geographic region. The information may include a name of a state, city, county, town, etc., a zip code or group of zip codes, and/or other types of information. Category field 840 may store information identifying categories of television programming, such as action, romance, sports, comedy, drama, etc. In one implementation, category field 840 may also store a "general" category, which corresponds to all of the categories. Multiple categories, in category field 840, may be associated with a single entry in region field 830. Most popular list field 850 may store lists of television channels (or programs) that are currently most popular for the category identified in category field 840 and the region identified in region field 830. The list of television channels corresponding to the "general" category may provide a list of the most popular television channels (or programs) for the region identified in region field 830, regardless of category.

Although FIG. 8B shows example fields of database 820, in other implementations, database 820 may include fewer fields, different fields, differently arranged fields, or additional fields than depicted in FIG. 8B.

Figure 9:
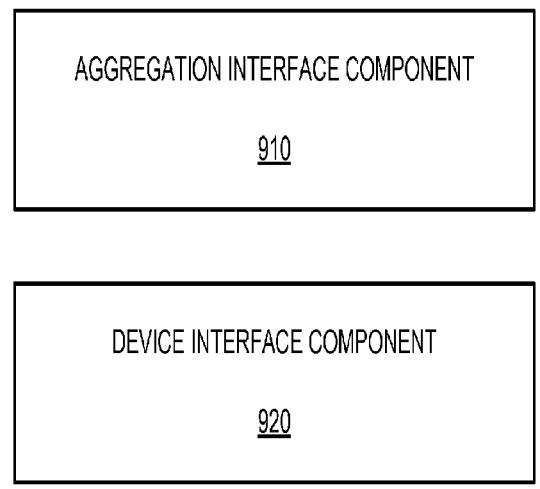
FIG. 9 is a diagram of example functional components of a portion of the distribution server of FIG. 4.

FIG. 9 is a diagram of example functional components of a portion 900 of distribution server 424. In one implementation, the functional components described in connection with FIG. 9 may be implemented via, for example, processor 520 executing instructions contained in memory 530. As illustrated, distribution server 424 may include an aggregation interface component 910 and a device interface component 920.

Aggregation interface component 910 may include one or more components that receive thumbnails and metadata from aggregation server 422. Aggregation interface component 910 may also store the received thumbnails and metadata. Device interface component 920 may include one or more components that forward thumbnails and metadata to devices, such as user devices 210, a web server, and/or other devices. Device interface component 920 may forward thumbnails and metadata to a device in response to a request for thumbnails by the device. Device interface component 920 may also, or alternatively, forward thumbnails and metadata automatically (e.g., in response to some event).

Although FIG. 9 illustrates example functional components of distribution server 424, in other implementations, distribution server 424 may include fewer functional components, different functional components, differently arranged functional components, or additional functional components than those depicted in FIG. 9. Additionally, or alternatively, one or more functional components of distribution server 424 may perform one or more tasks described as being performed by one or more other functional components of distribution server 424.

Figure 10:
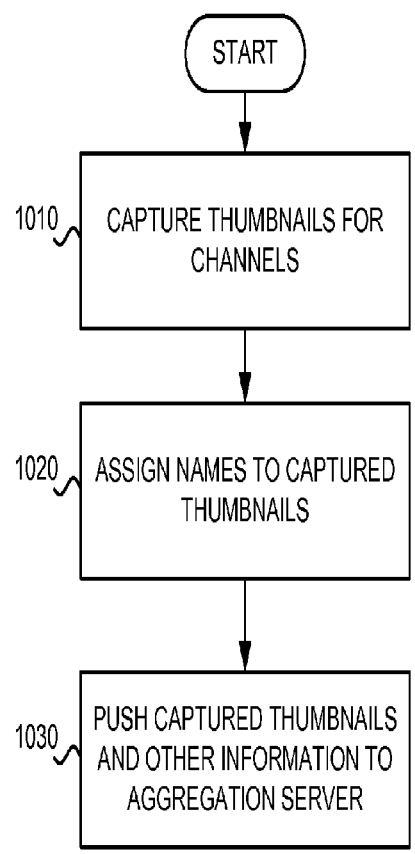
FIG. 10 is a flow chart of an example process for pushing thumbnails to the aggregation server of FIG. 4.

FIG. 10 is a flow chart of an example process 1000 for pushing thumbnails to aggregation server 422. Process 1000 may be performed by video hub office 410. In another implementation, some or all of the processing described in FIG. 10 may be performed by one or more devices separate from or in combination with video hub office 410.

Process 1000 may include capturing thumbnails for television channels (block 1010). In one implementation, video hub office 410 (e.g., thumbnail capture component 610) may capture thumbnails of programs currently airing on television channels with which video hub office 410 is associated. For example, thumbnail capture component 610 may capture, at some time period, thumbnails for the programs. In one implementation, thumbnail capture component 610 may capture thumbnails, for each television channel, roughly every 7 seconds. Different time periods (or groups of time periods) may alternatively be used. For example, thumbnail capture component 610 may capture thumbnails, for each television channel, at a first rate at certain times of the day (e.g., for the first 10 minutes following an hour or half hour of the day) and at a second, different rate at other times of the day (e.g., from 10 minutes to 20 minutes following an hour or half hour of the day). Thumbnail capture component 610 may simultaneously capture thumbnails for all programs currently airing on the television channels with which video hub office 410 is associated. Thus, if video hub office 410 is associated with 600 television channels, thumbnail capture component 610 may simultaneously capture 600 thumbnails. Alternatively, thumbnail capture component 610 may simultaneously capture a subset of all of the associated television channels.

Process 1000 may further include assigning names to the captured thumbnails (block 1020). For example, video hub office 410 (e.g., thumbnail capture component 610) may assign a name to each captured thumbnail. In one implementation, the name may be a unique name that corresponds to the television channel from which the thumbnail was captured. For example, thumbnail capture component 610 may assign a name of "0001.jpg" to the thumbnail that was captured from channel 1, a name of "0002.jpg" to the thumbnail that was captured from channel 2, etc. In addition, thumbnail capture component 610 may associate other information with the thumbnail. For example, thumbnail capture component 610 may cause a date and/or time, reflecting the date and/or time that a particular thumbnail was captured, to be associated with the particular thumbnail. Alternatively, the name assigned by thumbnail capture component 610 to a thumbnail may reflect not only the television channel from which the thumbnail was captured, but also the date and/or time. Thus, in the example above, thumbnail capture component 610 may assign a name of 00011010101100.jpg, where "0001" may correspond to the television channel, "101010" may correspond to the date (i.e., Oct. 10, 2010), and "1100" may correspond to the time (i.e., 11 am). Other naming conventions may alternatively be used. Alternatively, other techniques for associating information, such as the channel associated with a thumbnail, may be used. For example, the channel and date/time of the thumbnail may be embedded within the thumbnail, such as within a header of the thumbnail image file.

Process 1000 may further include pushing the captured thumbnails to aggregation server 422 (block 1030). For example, video hub office 410 (e.g., interface component 620) may push captured thumbnails to aggregation server 422. In one implementation, interface component 620 may provide the captured thumbnails automatically in response, for example, to the thumbnails being captured. Interface component 620 may also provide captured thumbnails at other times. For example, interface component 620 may provide captured thumbnails in response to requests from aggregation server 422 and/or at periodic intervals.

Process 1000 may further include pushing other information to aggregation server 422 (block 1030). For example, video hub office 410 (e.g., interface component 620) may transmit one or more lists to aggregation server 422 that identify the most popular television channels (or programs) in one or more areas in the particular geographic region with which video hub office 410 is associated. Interface component 620 may transmit a single list that identifies the television channels (or programs) that are currently most popular in the particular geographic area and/or multiple lists (e.g., based on the zip codes in the particular geographic area) that identify the television channels (or programs) that are currently most popular in each zip code in the geographic area. Other alternatives are possible. For example, interface component 620 may transmit, to aggregation server 422, multiple lists for a geographic area, where each list corresponds to the most popular television channels (or programs) that are currently available on television on a per category basis (e.g., sports, comedy, drama, etc.) and/or based on other information.

Figure 11:
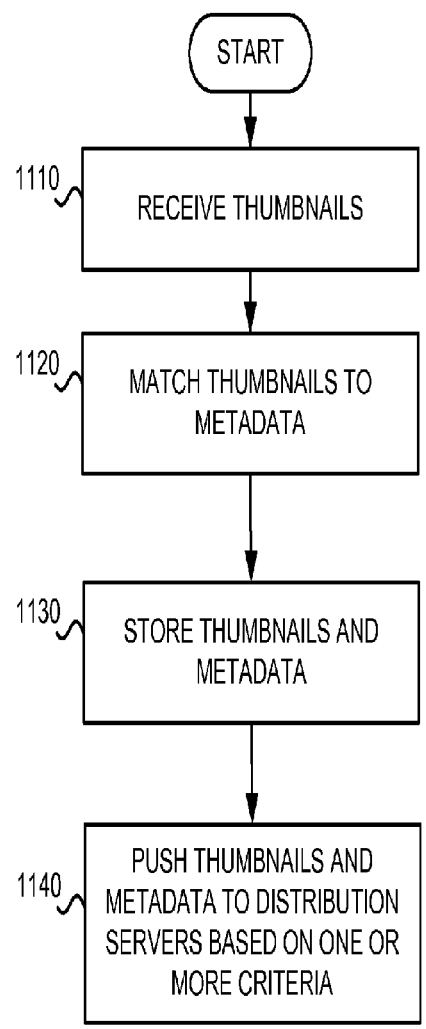
FIG. 11 is a flow chart of an example process for processing thumbnails.

FIG. 11 is a flow chart of an example process 1100 for processing thumbnails. Process 1100 may be performed by aggregation server 422. In another implementation, some or all of the processing described in FIG. 11 may be performed by one or more devices separate from or in combination with aggregation server 422.

Process 1100 may include receiving thumbnails (block 1110). In one implementation, aggregation server 422 (e.g., video hub office interface component 710) may receive thumbnails (and possibly other information, such as popularity lists) from video hub offices 410. Due to the volume of thumbnails being received from video hub offices 410 (e.g., 600 or more thumbnails may be received, in a time period, from each video hub office 410), aggregation server 422 may reset the ports of video hub office interface component 710, for example, if the number of open ports reaches a limit. As a result of this periodic resetting of the ports, the processing of incoming thumbnails may be increased.

Process 1100 may further include matching received thumbnails with metadata (block 1120). For example, aggregation server 422 (e.g., thumbnail aggregation component 720) may identify a program with which a received thumbnail is associated based on the name assigned to the thumbnail. As an example, if a received thumbnail has a name of 0001.jpg, then thumbnail aggregation component 720 can look up the program with which the thumbnail is associated by determining, for example, what program is currently airing on channel 1 in connection with the particular video hub office 410 with which the channel is associated. Thumbnail aggregation component 720 may make this determination based, for example, on television guide data that is either stored at aggregation server 422 or received from another device. Thumbnail aggregation component 720 may then use the identity of the program to obtain the corresponding metadata. Alternatively, thumbnail aggregation component 720 may obtain the corresponding metadata in other ways, such as by directly using the name assigned to the thumbnail (e.g., by identifying the television channel from which the thumbnail was captured).

Process 1100 may also include storing the thumbnails and metadata (block 1130). For example, aggregation server 422 (e.g., thumbnail aggregation component 720) may store the received thumbnails and matching metadata in a group of queues, as described above with respect to FIG. 8A. In one implementation, aggregation server 422 may accumulate thumbnails, received from different video hub offices 410, which correspond to the same television channel. For example, for national television channels, thumbnails will be the same across a group of video hub offices 410. For each of these national television channels, thumbnail aggregation component 720 may, for example, store one thumbnail (received from one of video hub offices 410) and discard any other thumbnails, received for the national television channel, from other video hub offices 410. In this way, aggregation server 422 may avoid providing duplicate thumbnails for the same national television channel.

Process 1100 may additionally include pushing thumbnails and metadata to distribution servers 424 based on one or more criteria (block 1140). For example, aggregation server 422 (e.g., distribution server interface component 730) may provide the thumbnails and metadata, to distribution servers 424, in response to one or more events. Distribution server interface component 730 may provide metadata, for a particular television channel, a single time during a thirty minute period or may provide metadata, for the particular television channel, each time a thumbnail is provided.

In either event, aggregation server 422 may provide thumbnails to distribution servers 424 at one or more periodic intervals of time. The intervals of time may be on the order of seconds or minutes. Distribution server interface component 730 may provide thumbnails, to distribution servers 424, at different rates, depending on the time of the day. For example, distribution server interface component 730 may provide thumbnails more often shortly after the hour and half hour (e.g., every 2 minutes) since new programs may be starting on the television channels. In addition, distribution server interface component 730 may provide thumbnails less often (e.g., every 5 minutes) between 10 minutes after the hour or half hour to 30 minutes after the hour or half hour. As an example, distribution server interface component 730 may provide thumbnails, to distribution servers 424, every 2 minutes between 1:00 pm and 1:10 pm, every 5 minutes between 1:10 pm and 1:30 pm, every 2 minutes between 1:30 pm and 1:40 pm, and every 5 minutes between 1:40 pm and 2:00 pm.

Additionally, or alternatively, aggregation server 422 may provide a different quantity of thumbnails to distribution servers 424 at different times. For example, distribution server interface component 730 may provide a larger quantity of thumbnails (per television channel), to distribution servers 424, on or near the hour and half hour than at other times of the day. As an example, distribution server interface component 730 may provide 5 thumbnails (for every television channel), to distribution servers 424, every 2 minutes between 1:00 pm and 1:10 pm, 1 thumbnail (for every television channel) every 5 minutes between 1:10 pm and 1:30 pm, 5 thumbnails (for every television channel) every 2 minutes between 1:30 pm and 1:40 pm, and 1 thumbnail (for every television channel) every 5 minutes between 1:40 pm and 2:00 pm.

Aggregation server 422 may also prioritize the order in which thumbnails are provided to distribution servers 424. For example, distribution server interface component 730 may provide thumbnails that are associated with television channels that have been identified as currently being most popular (e.g., based on one or more popularity lists, such as described above with respect to FIG. 8B) before thumbnails that are associated with television channels that have been identified as currently being less popular. In addition, distribution server interface component 730 may provide thumbnails in an order based on the priority in the popularity lists.

Figure 12:
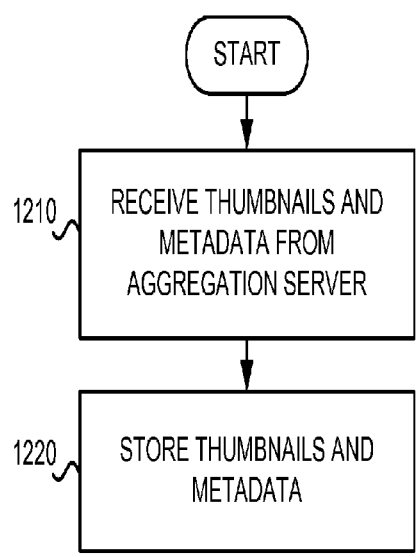
FIG. 12 is a flow chart of an example process for processing thumbnails received from the aggregation server of FIG. 4.

FIG. 12 is a flow chart of an example process 1200 for processing thumbnails received from aggregation server 422. Process 1200 may be performed by a distribution server 424. In another implementation, some or all of the processing described in FIG. 12 may be performed by one or more devices separate from or in combination with distribution server 424.

Process 1200 may include receiving thumbnails and metadata from aggregation server 422 and storing the thumbnails and metadata (blocks 1210 and 1220). For example, distribution server 424 (e.g., aggregation interface component 910) may receive thumbnails and metadata from aggregation server 422. Aggregation interface component 910 may also store the received thumbnails and metadata. Similar to the aggregation server 422, aggregation interface component 910 may store the received thumbnails in a last in, first out manner to ensure that the most recent thumbnails are provided to devices.

Figure 13A:
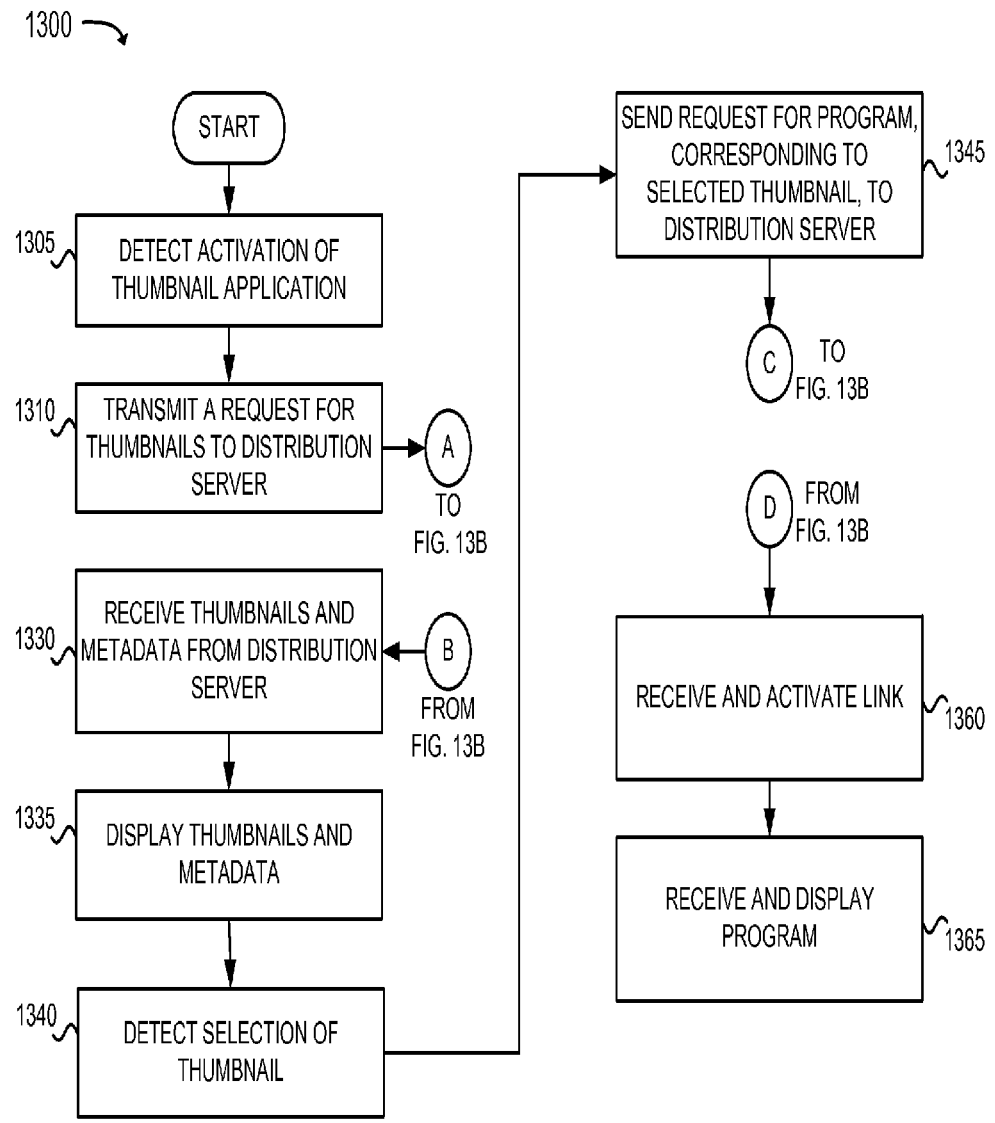
FIGS. 13A and 13B are a flow chart of an example process for providing thumbnails.
Figure 13B:
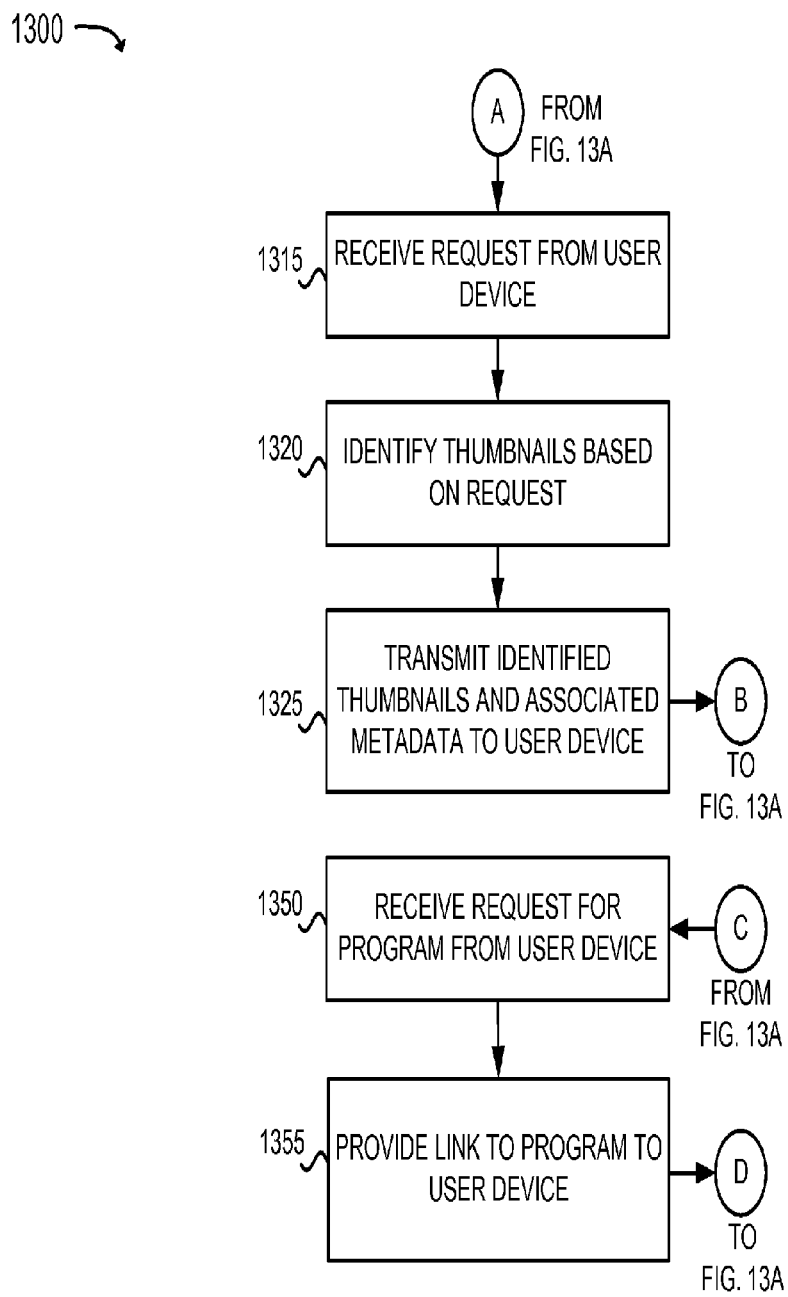

FIGS. 13A and 13B are a flow chart of an example process 1300 for providing thumbnails. The processing described in FIG. 13A may be performed by a user device (e.g., user device 210). In another implementation, some or all of the processing described in FIG. 13A may be performed by one or more devices separate from or in combination with user device 210. The processing described in FIG. 13B may be performed by a distribution server (e.g., distribution server 424-1). In another implementation, some or all of the processing described in FIG. 13B may be performed by one or more devices separate from or in combination with distribution server 424-1.

Process 1300 may include detection or initiating activation of a thumbnail application (block 1305). In one implementation, a user (e.g., of user device 210) may desire to view what is currently on television. The user may, via user device 210, activate an application on user device 210 by, for example selecting the application. In response to activating the application, user device 210 may transmit a request, to an authentication server, to authenticate the user. The request may include information identifying the user and/or user device 210. If the user and/or user device has/have been properly authenticated, the authentication server may notify user device 210 of this result. The authentication server may also provide an address of a distribution server (e.g., distribution server 424-1) from which user device 210 may request thumbnails. The address of the distribution server may be provided to user device 210 in other manners. For example, the application on user device 210 may be preconfigured with an address of a distribution server.

Process 1300 may further include transmitting a request for thumbnails to a distribution server (block 1310). For example, user device 210 may transmit a request to distribution server 424-1 using the address obtained, for example, from the authentication server. The request may simply include a request for thumbnails or may include other information relating to the thumbnails that are to be provided. For example, the application may allow the user to select what type of thumbnails is to be provided, such as thumbnails that are provided in an order based on television channel number, thumbnails for a particular geographic area, thumbnails for a particular category of programming, thumbnails corresponding to television channels that are currently most popular, thumbnails corresponding to television channels that are currently most popular in a particular geographic area, thumbnails corresponding to television channels that are currently most popular in a particular category, thumbnails corresponding to television channels that are currently most popular in a particular geographic area and in a particular category, and/or based on other types of criteria.

Process 1300 may further include receiving the request for thumbnails from user device 210, identifying thumbnails based on the request, and transmitting the identified thumbnails and associated metadata to user device 210 (blocks 1315, 1320, and 1325, FIG. 13B). For example, distribution server 424-1 (e.g., device interface component 920) may receive the request from user device 210 and may identify a group of thumbnails to provide to user device 210 based on the request. Thus, if the request indicates that thumbnails corresponding to the television channels that are currently the most popular are to be provided, distribution server 424-1 may identify the appropriate thumbnails corresponding to those television channels. Distribution server 424-1 (e.g., device interface component 920) may transmit the appropriate thumbnails and associated metadata to user device 210.

Process 1300 may also include receiving thumbnails and metadata from the distribution server and displaying the thumbnails and metadata (blocks 1330 and 1335, FIG. 13A). For example, user device 210 may receive the thumbnails and metadata from device interface component 920 (of distribution server 424-1) and cause the thumbnails and metadata to be displayed to the user. User device 210 may display the thumbnails and metadata in, for example, a scrollable list or in another format.

As an alternative to the process of obtaining thumbnails and metadata described above, in another implementation, user device 210 may obtain the thumbnails and metadata in other ways. For example, user device 210 may obtain the thumbnails and metadata from one or more web pages that may be provided by video service provider system 220 and/or a web server associated with video service provider system 220.

While the thumbnails and metadata are displayed on user device 210, user device 210 may periodically send requests to distribution server 424-1 for updated thumbnails. The time period by which user device 210 sends the requests may be configurable by the user. In this way, the displayed thumbnails may be periodically updated with new thumbnails.

Process 1300 may include detecting selection of a thumbnail and sending a request for the program, corresponding to the selected thumbnail, to the distribution server (blocks 1340 and 1345). For example, assume that the user identifies a program that he/she wants to view based on the displayed thumbnails and metadata. To view the program, the user may select the appropriate thumbnail (e.g., by touching the thumbnail on a touchscreen, by clicking on the thumbnail using a mouse, keypad, or keyboard, etc.). In response to selecting the thumbnail, user device 210 may transmit a request for the program to distribution server 424-1. The request may include information identifying the selected thumbnail (e.g., the name of the selected thumbnail).

Process 1300 may further include receiving the request for the program from user device 210 and providing a link to the program to user device 210 (blocks 1350 and 1355, FIG. 13B). For example, distribution server 424-1 (e.g., device interface component 920) may receive the request from user device 210 and parse the request to identify the thumbnail that has been selected. Distribution server 424-1 may use the identity of the thumbnail to identify a location from which the program, corresponding to the selected thumbnail, may be provided. For example, distribution server 424-1 may identify a server, from which the program may be streamed, and obtain a link to the program at the server. Distribution server 424-1 (e.g., device interface component 920) may then send the link to the program to user device 210.

Process 1300 may additionally include receiving and activating the link (block 1360, FIG. 13A). For example, user device 210 may receive the link to the program from distribution server 424-1 and activate the link. Alternatively, user device 210 may present the link to the user for activation. Activation of the link may cause user device 210 to transmit a request for the program to the server.

Process 1300 may include receiving and displaying the program (block 1365). For example, in response to the transmission of the request for the program to the server, the server may begin streaming the program to user device 210. User device 210 may receive the streaming program and display the program to the user. Other ways of obtaining the program may alternatively be used.

Figure 14A:
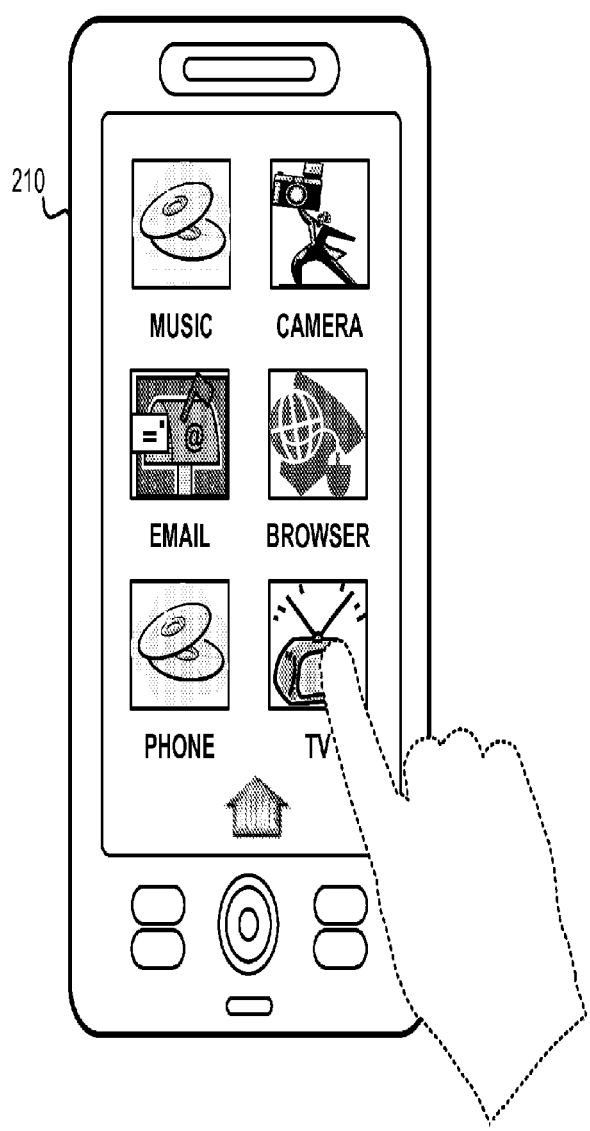
FIGS. 14A-14D provide an example of the process described in connection with FIGS. 13A and 13B.
Figure 14B:
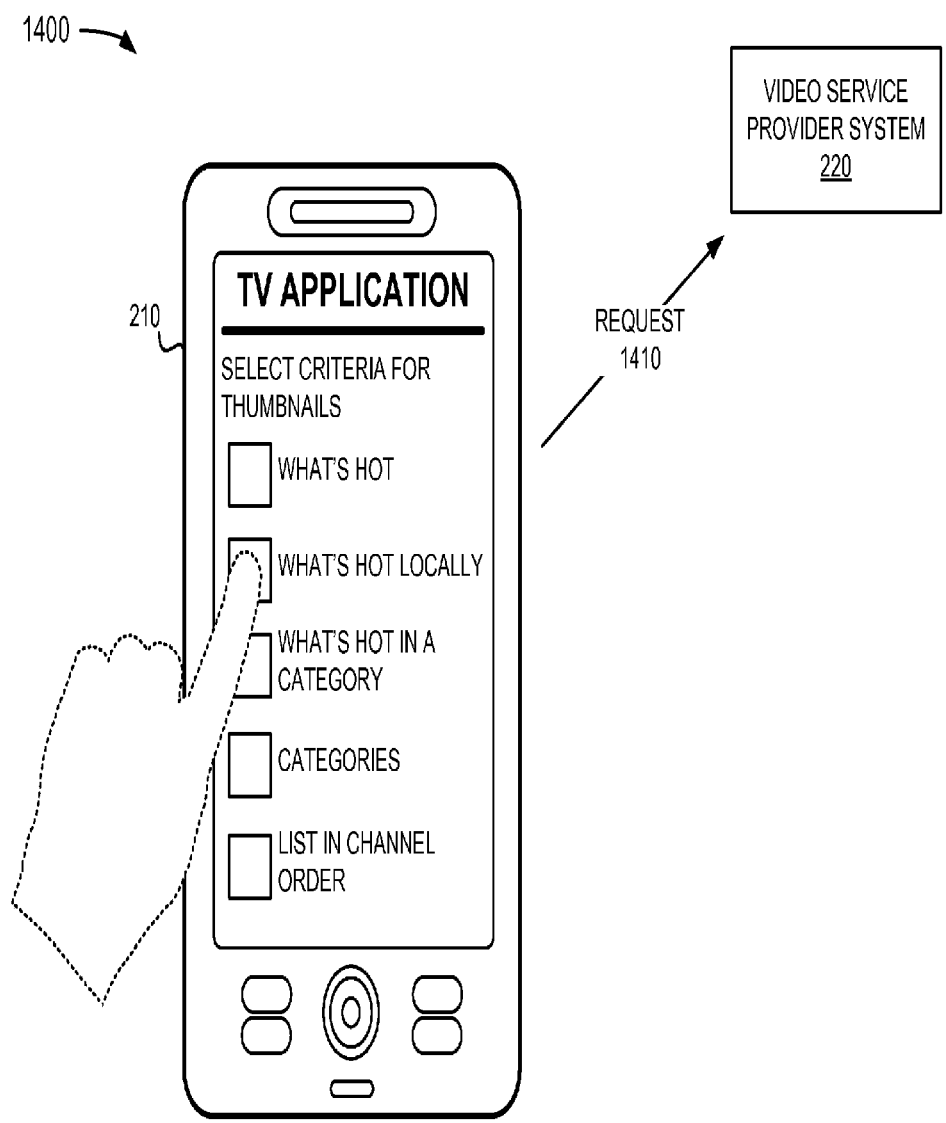

FIGS. 14A-14D provide an example 1400 of the processing described above with respect to FIGS. 13A and 13B. In example 1400 (FIG. 14A), assume that the user, of user device 210, has activated an application called "TV," which causes thumbnails of programs currently airing on television to be displayed. In response to selection of the TV application, user device 210 may, as illustrated in FIG. 14B, allow the user to specify criteria relating to the thumbnails. For example, as illustrated in FIG. 14B, user device 210 may allow the user to obtain a listing of programs that are currently the most popular on television ("what's hot"), a listing of programs that are currently the most popular on television for a particular geographic area ("what's hot locally"), a listing of programs that are currently the most popular on television for a particular category ("what's hot in a category"), a listing of programs in a particular category ("categories"), a sequential listing of programs based on channel numbers ("list in channel order"), and/or other types of listings.

Assume, as illustrated in FIG. 14B, that the user selects the "what's hot locally" criterion. In response, user device 210 may transmit a request 1410 for thumbnails, corresponding to programs that are currently the most popular, to video service provider system 220 (e.g., to a distribution server 424). Request 1410 may include information identifying the criterion selected by the user. In addition, request 1410 may include information identifying the location of user device 210. Assume, for example 1400, that user device 210 is currently located in Fairfax, Va.

Figure 14C:
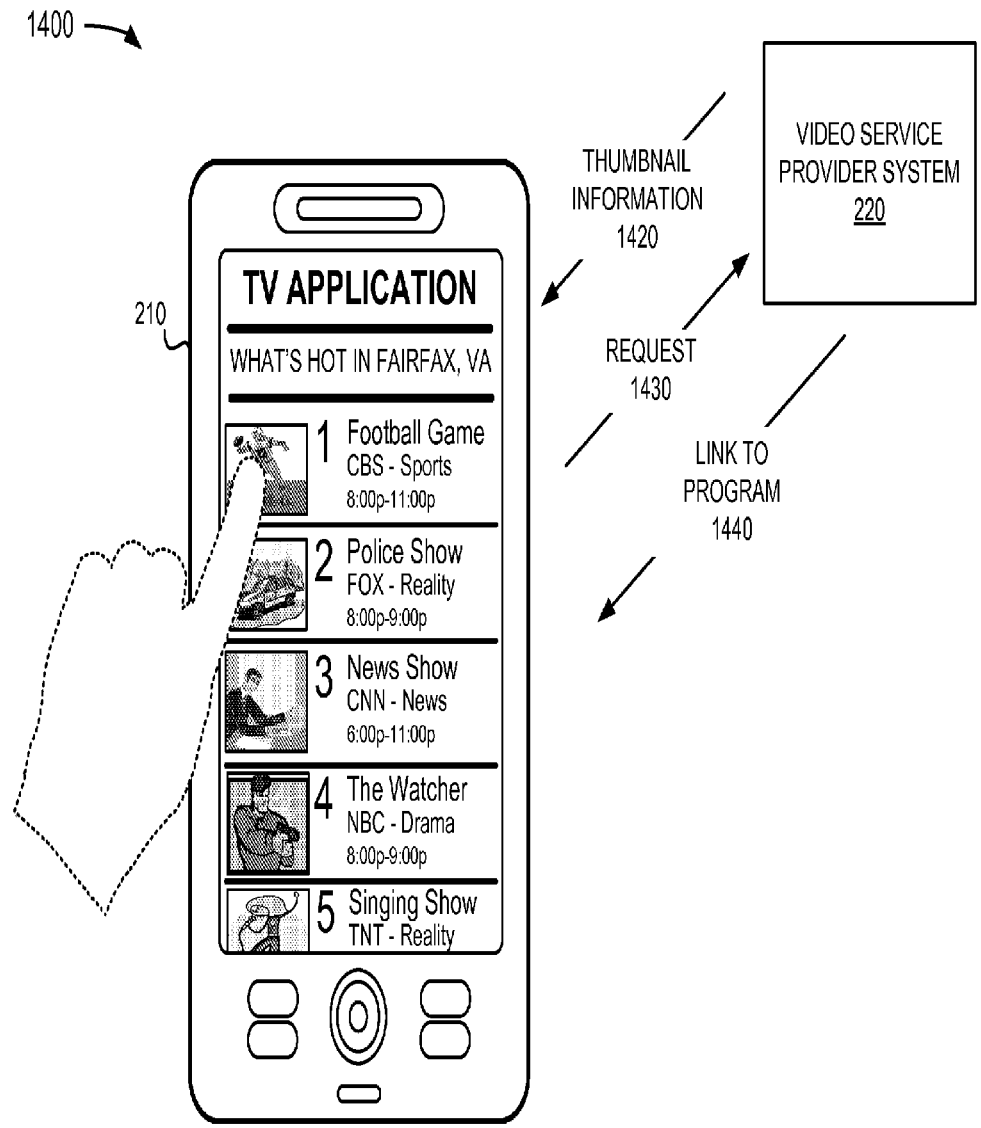

In response to receiving request 1410, video service provider system 220 may provide thumbnail information 1420 to user device 210, as illustrated in FIG. 14C. Thumbnail information 1420 may include thumbnails and associated metadata, corresponding to the television channels that are currently most popular in the Fairfax, Va. area. As illustrated, the Football Game is the most popular program, the Police Show is the second most popular program, the News Show is the third most popular program, etc.

Assume that the user desires to watch the Football Game. Thus, as illustrated in FIG. 14C, the user may select the thumbnail corresponding to the Football Game. In response to the selection, user device 210 may transmit a request 1430 to video service provider system 220. Request 1430 may identify user device 210 and the selected thumbnail (and/or the program corresponding to the selected thumbnail).

Video service provider system 220 may receive request 1430 and provide, in response to receiving request 1430, a link 1440 to the program. Link 1440 allows user device 210 to obtain the program from a server. Upon receipt of link 1440, user device 210 may present link 1440 to the user for selection or may automatically select link. In either event, selection of the link may cause a request for the program to be sent, from user device 210, to the server.

Figure 14D:
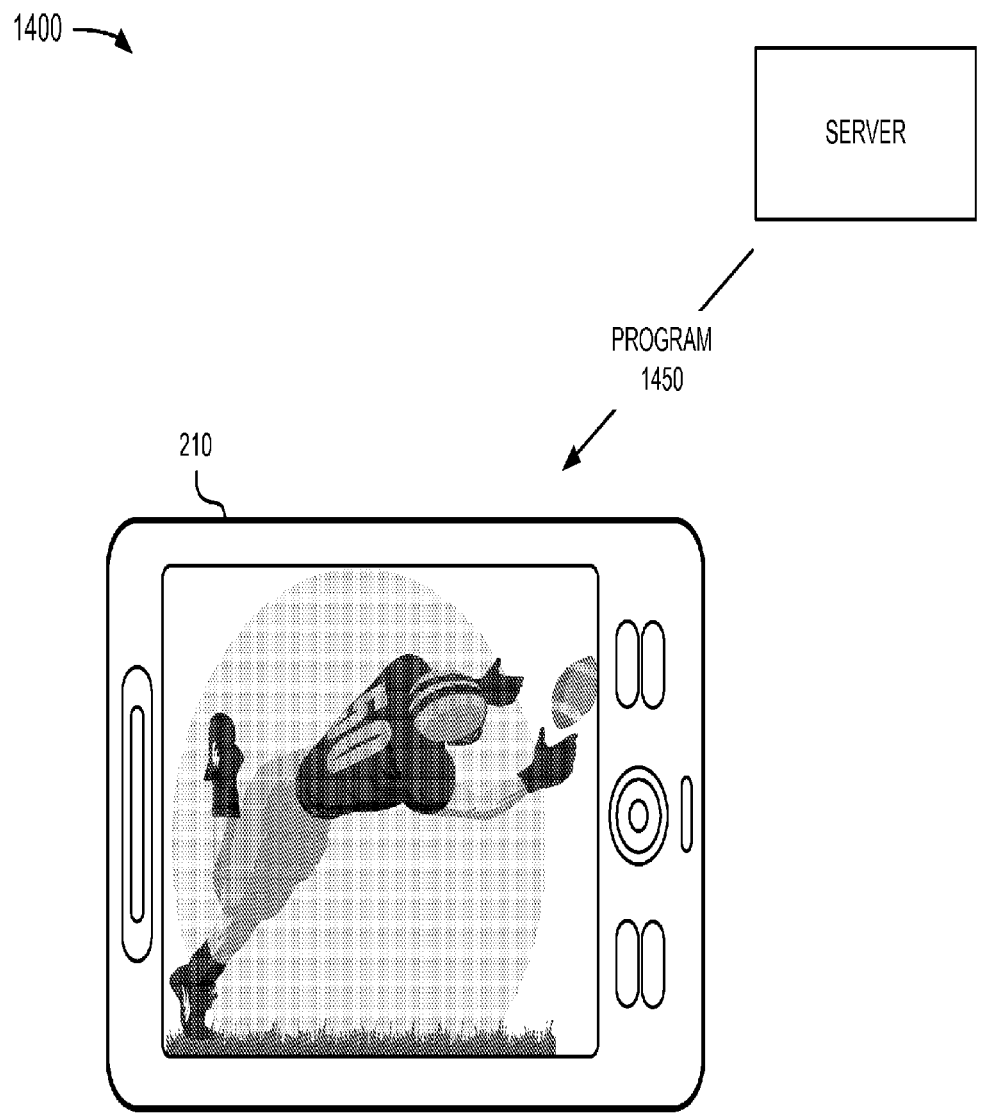

In response to the request, the server may stream program 1450 to user device 210, as illustrated in FIG. 14D. In this way, the user may view a program that was identified in the thumbnail list.

As an alternative to streaming the program to user device 210, the application on user device 210 (i.e., the TV application in example 1400) may allow the user to choose to have the program, corresponding to a selected thumbnail, recorded on the user's digital video recorder (DVR) and/or locally on user device 210.

The foregoing description provides illustration and description, but is not intended to be exhaustive or to limit the invention to the precise form disclosed. Modifications and variations are possible in light of the above teachings or may be acquired from practice of the invention. For example, while the above description focused on providing thumbnails based on one or more criteria specified by the user, implementations described herein are not so limited. For instance, video service provider system 220 may automatically provide particular thumbnails (and metatdata) to the user. In one implementation, video service provider system 220 may automatically provide thumbnails corresponding to the television channels (or programs) that are currently most popular for the geographic location in which the user's device is located.

While series of blocks have been described with regard to FIGS. 10-13B, the order of the blocks may be modified in other implementations. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
obtaining, by an aggregation server device of a video service provider system, thumbnails representative of corresponding programs presented via a group of television channels associated with the video service provider system;
matching, by the aggregation server device of the video service provider system, the thumbnails with metadata including information relating to the corresponding programs;
sending, by the aggregation server device, a set of thumbnails and the matching metadata to a plurality of distribution server devices of the video service provider system at different rates based on a time of day; and
providing, by the plurality of distribution server devices of the video service provider system and to a remote device, the set of the thumbnails and the matching metadata for display.

2. The method of claim 1, further comprising:
storing the thumbnails and the matching metadata in one or more last in, first out queues associated with the video service provider system.

3. The method of claim 1, wherein obtaining the thumbnails includes:
receiving the thumbnails via a plurality of video hub offices at a number of different rates corresponding to a number of different time of day intervals.

4. The method of claim 1, further comprising:
sending, by the aggregation server device, the set of thumbnails and the matching metadata to the plurality of distribution server devices in an order based on popularity information related to the corresponding programs.

5. A system comprising:
an aggregation server to:
aggregate, from a plurality of first network devices, thumbnails representative of a program presented via television channel,
discard duplicates of the thumbnails received from the plurality of first network devices,
store the thumbnails in a group of queues corresponding to the program, and
transmit, from the group of queues, a set of the thumbnails to a distribution server; and
the distribution server, to:
receive the set of the thumbnails from the aggregation server,
receive a request for thumbnails from a second network device, and
provide, to the second network device and based on the request, a group of thumbnails of the received set of the thumbnails.

6. The system of claim 5, wherein the plurality of first network devices includes a plurality of geographically-distributed video hub offices, and wherein the aggregation server is to:
receive, via the video hub offices, first ones of the set of thumbnails at a first rate during a first time period, and
receive, via the video hub offices, second ones of the set of thumbnails at a second, different rate during a second time period.

7. The system of claim 5, wherein the group of queues includes a group of last in, first out queues.

8. The system of claim 5, wherein, when transmitting the set of the thumbnails, the aggregation server is to:
transmit the set of thumbnails in an order, with respect to transmission of other thumbnails representative of other programs, based on a popularity of the program relative to the other programs.

9. The system of claim 5, wherein, when transmitting the set of the thumbnails, the aggregation server is to:
transmit first ones of the set of thumbnails at a first rate during a first time period, and
transmit second ones of the set of thumbnails at a second, different rate during a second time period.

10. The system of claim 5, wherein, when transmitting the set of the thumbnails, the aggregation server is to:
transmit a first quantity of first ones of the set of thumbnails during a first time period, and
transmit a second, different quantity of second ones of the set of thumbnails during a second time period.

11. The system of claim 5, wherein the second network device comprises a web server configured to populate a web page with the group of thumbnails.

12. The system of claim 5, wherein the second network device includes a wireless device, and
wherein the distribution server receives the request in response to activation of an application on the wireless device.

13. The system of claim 5, wherein the distribution server is further configured to:
receive, in response to providing the group of thumbnails, a request for the program from the second network device, and
provide, in response to receiving the request for the program and to the second network device, a link to a location from which the program is available.

14. A non-transitory computer-readable medium having stored thereon sequences of instructions which, when executed by at least one processor, cause the at least one processor of to:
obtain, at an aggregation server device of a video service provider system, thumbnails representative of corresponding programs presented via a group of television channels associated with the video service provider system;
match, at the aggregation server device, the thumbnails with metadata including information relating to the corresponding programs;
send, via the aggregation server device, a set of thumbnails and the matching metadata to a plurality of distribution server devices of the video service provider system at different rates based on a time of day; and
provide, from the aggregation server device, to a remote device, the set of the thumbnails and the matching metadata for display.

15. The non-transitory computer-readable medium of claim 14, wherein the instructions further cause the at least one processor to:
store the thumbnails and the matching metadata in one or more last in, first out queues associated with the video service provider system.

16. The non-transitory computer-readable medium of claim 14, wherein, to obtain the thumbnails, the instructions cause the at least one processor to receive the thumbnails via a plurality of video hub offices at a number of different rates corresponding to a number of different time of day intervals.

17. The non-transitory computer-readable medium of claim 14,
wherein the instructions further cause the at least one processor to:

send, via the aggregation server device, the set of thumbnails and the matching metadata to the plurality of distribution server devices in an order based on popularity information related to the corresponding programs.

18. The non-transitory computer-readable medium of claim 14, wherein the instructions cause the at least one processor to provide the set of the thumbnails and the matching metadata to the remote device in response to activation of an application on the remote device.

19. The non-transitory computer-readable medium of claim 14, wherein the instructions cause the at least one processor to receive, in response to providing the set of the thumbnails and the matching metadata to the remote device, a request from the remote device for a particular program, and provide, in response to receiving the request for the program and to the remote network device, a link to a location from which the particular program is available.

20. The non-transitory computer-readable medium of claim 14, wherein the instructions further cause the at least one processor to discard duplicates of the thumbnails.

* * * * *